United States Patent [19]

Hombach et al.

[11] 4,331,056

[45] May 25, 1982

[54] ROTARY DISK-CUTTER BLADE

[75] Inventors: Theodor Hombach, Kaarst; Ewald G. Welp, Erkrath, both of Fed. Rep. of Germany

[73] Assignee: Jagenberg Werke AG, Dusseldorf, Fed. Rep. of Germany

[21] Appl. No.: 147,449

[22] Filed: May 7, 1980

[30] Foreign Application Priority Data

May 22, 1979 [DE] Fed. Rep. of Germany ....... 2920610

[51] Int. Cl.³ .......................... B27B 5/32; B26D 7/26
[52] U.S. Cl. ..................................... 83/666; 83/665; 83/676; 83/698
[58] Field of Search ................. 83/666, 665, 676, 698

[56] References Cited

U.S. PATENT DOCUMENTS

| | | | |
|---|---|---|---|
| 601,773 | 4/1898 | Fosby | 83/666 |
| 3,805,661 | 4/1974 | Tuomaala | 83/666 |
| 3,894,461 | 7/1975 | Jakob | 83/666 |

Primary Examiner—Donald R. Schran
Attorney, Agent, or Firm—Sprung, Felfe, Horn, Lynch & Kramer

[57] ABSTRACT

A rotary disc cutter blade assembly comprises a cutter blade and the rotatable support on which the blade is mounted and which supports the blade within a radial support area. The rotatable supporting includes a resiliently deformable disc which airially supports the blade with initial tension outside the support area to effect noise reduction during use of the blade.

2 Claims, 1 Drawing Figure

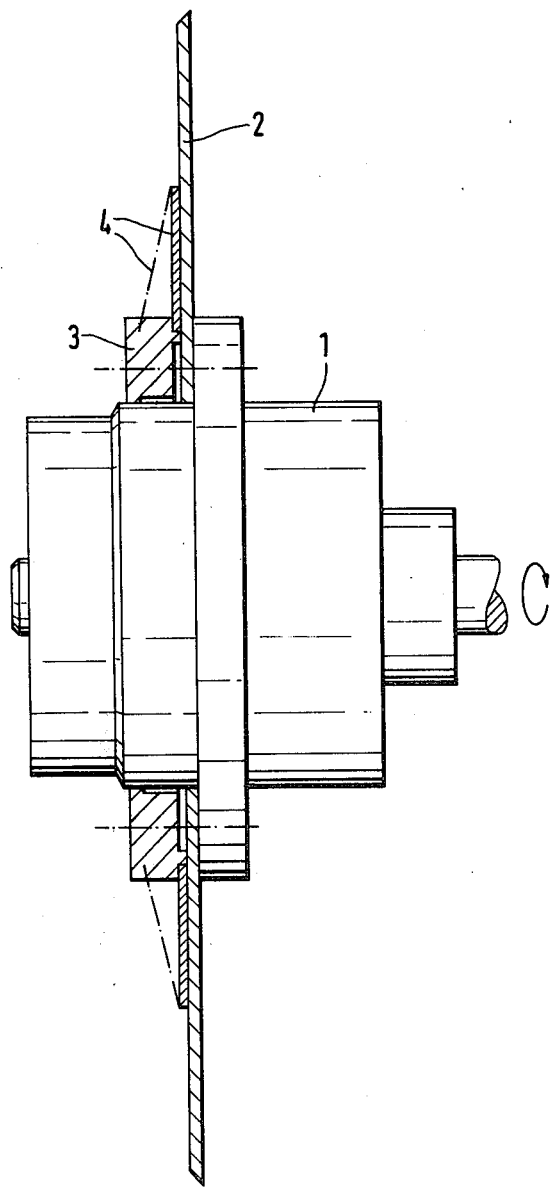

ROTARY DISK-CUTTER BLADE

BACKGROUND OF THE INVENTION

The invention relates to a rotary disk-cutter blade which is mounted on a rotatable support, preferably removably, and is provided with noise-reduction means. "Rotary disk-cutter blade" here also means a circular saw blade.

Because of their high circumferential speed, such cutter blades occasionally generate very loud noise as they engage the object to be cut. This noise is due to mechanical vibrations which are in the audible frequency range and are radiated as airborne sound.

SUMMARY OF THE INVENTION

The present invention has as its object to provide a suitable means for attenuating the noise of rotary disk-cutter blades, which is of simple construction, can be manufactured at low cost, and is effective in use.

In accordance with the invention, this object is accomplished, in the case of a rotary disk-cutter blade of the type outlined above, in that it is a really supported with initial tension outside its mounting area. This is preferably done by the use of spring means.

In accordance with an advantageous embodiment of the invention, the spring means consists of a convex or conical disk whose outside diameter is greater than that of a mounting ring but smaller than that of the cutter blade, which is in contact with said blade, which has its concave surface facing the blade, and which is mounted together with the blade for rotation.

Through areal support with initial tension in the area between the mounting point and cutting edge, as proposed in accordance with the invention, effective noise reduction is achieved by the use of a readily mounted means of relatively simple construction.

BRIEF DESCRIPTION OF THE DRAWING

An embodiment of the rotary disk-cutter blade provided with a noise-reduction means is shown in partial section in the accompanying FIGURE.

DETAILED DESCRIPTION OF THE INVENTION

Mounted on a rotatable support 1 by means of a mounting ring 3 for rotary entrainment is the annular disk-cutter blade 2.

Between the mounting ring 3 and the disk-cutter blade 2, arealicantly deformable member 4 defined by a surface of revolution, for example, a conical or convex disk, acting as a spring is disposed in accordance with the invention. The disk 4 is indicated by dash-dotted lines in its initial condition, prior to tightening of the mounting ring 3, in which its concave surface is in contact with the cutter blade 2. As the mounting ring 3 is tightened, the disk 4 is resiliently compressed into the position indicated in the drawing by the solid lines, in which it is flat against the disk-cutter blade 2. The outside diameter of the disk 4 is greater than the outside diameter of the mounting ring 3 but smaller than the outside diameter of the disk-cutter blade 2, so that support is provided in the area between the mounting point and the cutting edge of the blade and maximum contact area is secured.

In a particularly advantageous embodiment, a circular blade having a diameter of 20 cm and a width of 2 mm and composed of steel was mounted with a mounting area having a diameter of 9 cm. The noise reduction disk 4 was composed of steel and had an outer diameter of 15 cm with a pretensioned width of 3.25 mm and a tensioned width of 1.25 mm. The outer diameter of the disk 4 preferably ranges from 60 to 80 percent of the overall diameter of the blade and should have a thickness of from 1 to 2 mm and can be preferably made from aluminum, iron, steel, and nylon.

It will be appreciated that the instant specification and claims are set forth by way of illustration and not limitation, and that various changes and modifications may be made without departing from the spirit and scope of the present invention.

What is claimed is:

1. A rotary disk-cutter blade assembly comprising a rotatable support, a cutter blade having a central opening through which it is mounted on the support, one resiliently deformable dished member mounted having a central opening through which it is mounted on the support with a concave surface contacting one surface of the blade, the diameter of the deformable member ranging from 60 to 80% of that of the blade, and a mounting ring on the support and engaging the deformable member just about its inner periphery and deforming it into a flat disk contacting the blade over substantially the entire area of the deformable member.

2. An assembly according to claim 1, wherein the opening of the deformable member is larger than that of the blade, the ring being shaped so that it also contacts the blade within the opening of the deformable member.

* * * * *

UNITED STATES PATENT AND TRADEMARK OFFICE
CERTIFICATE OF CORRECTION

PATENT NO. : 4,331,056
DATED : May 25, 1982
INVENTOR(S) : Theodor Hombach et al

It is certified that error appears in the above—identified patent and that said Letters Patent is hereby corrected as shown below:

Col. 1, line 23     Delete "a really" and insert --areally--

Signed and Sealed this

Fifth Day of October 1982

[SEAL]

Attest:

GERALD J. MOSSINGHOFF

Attesting Officer     Commissioner of Patents and Trademarks